(12) United States Patent
Seibel et al.

(10) Patent No.: US 12,010,038 B2
(45) Date of Patent: Jun. 11, 2024

(54) EDGE UTILITY SYSTEM WITH DYNAMIC AGGREGATION OF EDGE RESOURCES ACROSS MULTIPLE EDGE COMPUTING SITES

(71) Applicant: Dell Products L.P., Round Rock, TX (US)

(72) Inventors: Amy N. Seibel, Newton, MA (US); Victor Fong, Melrose, MA (US); Eric Bruno, Shirley, NY (US)

(73) Assignee: Dell Products L.P., Round Rock, TX (US)

( * ) Notice: Subject to any disclaimer, the term of this patent is extended or adjusted under 35 U.S.C. 154(b) by 159 days.

(21) Appl. No.: 17/682,077

(22) Filed: Feb. 28, 2022

(65) Prior Publication Data
US 2023/0275847 A1    Aug. 31, 2023

(51) Int. Cl.
*G06F 9/30* (2018.01)
*G06F 9/50* (2006.01)
*H04L 47/80* (2022.01)
*H04L 67/1004* (2022.01)

(52) U.S. Cl.
CPC ................................. *H04L 47/80* (2013.01)

(58) Field of Classification Search
None
See application file for complete search history.

(56) References Cited

U.S. PATENT DOCUMENTS

| | | | |
|---|---|---|---|
| 10,484,341 B1 | 11/2019 | Todd et al. | |
| 10,756,904 B1 | 8/2020 | Perlman et al. | |
| 10,855,758 B1 | 12/2020 | O'Connell et al. | |
| 10,855,778 B2 | 12/2020 | Todd et al. | |
| 11,063,745 B1 | 7/2021 | Du et al. | |
| 11,128,437 B1 | 9/2021 | Nossik et al. | |
| 2020/0084202 A1* | 3/2020 | Smith | H04L 41/5003 |
| 2020/0228602 A1* | 7/2020 | Spoczynski | H04L 67/56 |
| 2021/0117555 A1* | 4/2021 | Bernat | H04L 9/30 |
| 2021/0144517 A1* | 5/2021 | Guim Bernat | H04L 41/0869 |
| 2021/0374841 A1 | 12/2021 | Fong et al. | |
| 2022/0394084 A1* | 12/2022 | Chen | H04L 67/10 |

OTHER PUBLICATIONS

U.S. Appl. No. 17/451,782, filed Oct. 21, 2021, and entitled "Use of IO Event Metadata to Enable XaaS Billing and Analytics."

* cited by examiner

*Primary Examiner* — Nicholas R Taylor
*Assistant Examiner* — Ho T Shiu
(74) *Attorney, Agent, or Firm* — Ryan, Mason & Lewis, LLP

(57) ABSTRACT

A method includes receiving inputs for respective users in an edge utility system comprising edge and core computing sites, with a first one of the inputs for a first user characterizing edge resources requested by that user for executing at least a portion of a workload of that user, and a second one of the inputs for a second user characterizing edge resources available from that user for executing at least a portion of a workload of another user. The method includes populating one or more data structures based at least in part on the received inputs, aggregating edge resources of multiple ones of the edge computing sites into an edge network based at least in part on the populated data structures, and utilizing at least a portion of the aggregated edge resources of the edge network to execute at least a portion of a workload of a particular user.

20 Claims, 11 Drawing Sheets

EDGE UTILITY SYSTEM WITH DYNAMIC AGGREGATION OF EDGE RESOURCES ACROSS MULTIPLE EDGE COMPUTING SITES

FIELD

The field relates generally to information processing, and more particularly to techniques for managing information processing systems.

BACKGROUND

Information processing systems increasingly utilize reconfigurable virtual resources to meet changing user needs in an efficient, flexible and cost-effective manner. For example, cloud computing and storage systems implemented using virtual resources such as virtual machines have been widely adopted. Other virtual resources now coming into widespread use in information processing systems include Linux containers. Such containers may be used to provide at least a portion of the virtualization infrastructure of a given cloud-based information processing system. However, significant technical problems can arise in the management of resources in these and other information processing systems, such as ensuring that adequate resources are available to service varying workload demand.

SUMMARY

Illustrative embodiments of the present disclosure provide techniques for dynamic aggregation of edge resources across multiple edge computing sites. The techniques are illustratively implemented in what is referred to herein as an "edge utility system" comprising distributed core and edge computing sites having respective sets of resources, such as compute, storage and network resources.

These and other embodiments disclosed herein advantageously overcome one or more of the above-noted technical problems, by providing technical solutions in which edge resources of multiple edge computing sites are dynamically aggregated in a highly efficient and reliable manner that facilitates the servicing of varying workload demand from a potentially large number of users in an information processing system.

In one embodiment, an apparatus comprises at least one processing device comprising a processor coupled to a memory. The at least one processing device is configured to receive a plurality of inputs for respective users in an edge utility system, the edge utility system comprising a plurality of edge computing sites coupled to one or more core computing sites via at least one network, at least a first one of the inputs for a first one of the users characterizing edge resources requested by that user for executing at least a portion of a workload of that user, and at least a second one of the inputs for a second one of the users characterizing edge resources available from that user for executing at least a portion of a workload of another user; to populate one or more data structures based at least in part on the plurality of inputs received for the respective users in the edge utility system; to aggregate edge resources of multiple ones of the edge computing sites into an edge network based at least in part on the populated data structures; and to utilize at least a portion of the aggregated edge resources of the edge network to execute at least a portion of a workload of a particular one of the users.

Other illustrative embodiments include, by way of example and without limitation, methods and computer program products comprising non-transitory processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources, or an enterprise-based information processing system, or combinations thereof. Numerous other types of enterprise and cloud-based computing and storage systems are also encompassed by the term "information processing system" as that term is broadly used herein.

Figure 1:
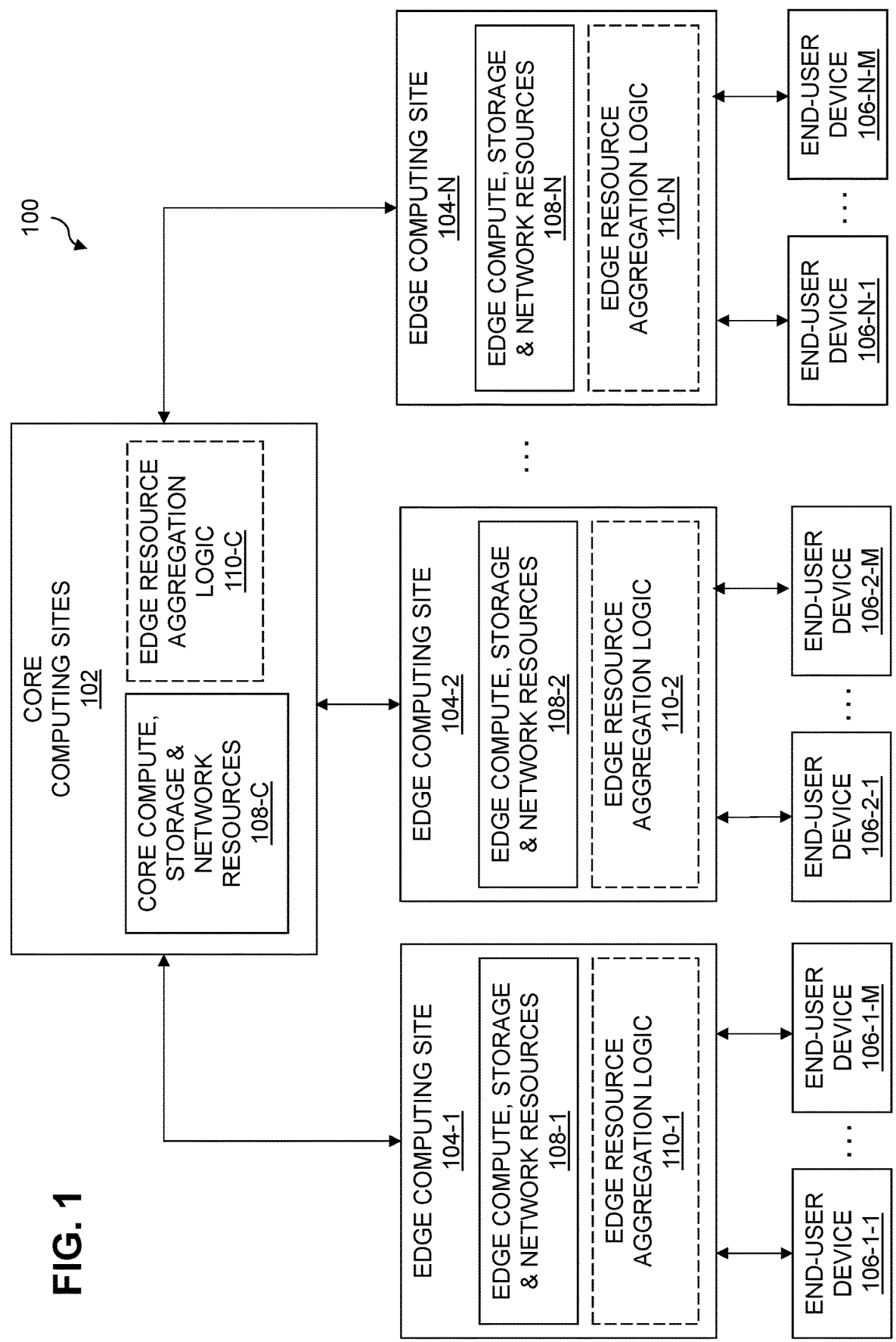
FIG. 1 is a block diagram of an information processing system configured for dynamic aggregation of edge resources across multiple edge computing sites in an illustrative embodiment.

FIG. 1 shows an information processing system 100 configured with functionality for dynamic aggregation of edge resources in an illustrative embodiment. The information processing system 100 comprises one or more core computing sites 102 coupled to a plurality of edge computing sites 104-1, 104-2, . . . 104-N, collectively referred to as edge computing sites 104. Each of the edge computing sites 104 illustratively has multiple end-user devices 106 associated therewith. More particularly, a first set of end-user devices 106-1-1, . . . 106-1-M are coupled to edge computing site 104-1, a second set of end-user devices 106-2-1, . . . 106-2-M are coupled to edge computing site 104-2, and a final set of end-user devices 106-N-1, . . . 106-N-M are coupled to edge computing site 104-N. The sets of end-user devices 106-1, 106-2, . . . 106-N are collectively referred to as end-user devices 106. It should be noted that the values M and N are arbitrary integers, where N is greater than or equal to two and M is greater than or equal to one. In other embodiments, different numbers of end-user devices 106 may be coupled to each of the edge computing sites 104.

Also, although each of the end-user devices 106 is illustrated in the figure as being coupled to a particular one of the edge computing sites 104, this is by way of example only, and a given one of the end-user devices 106 may be coupled to multiple ones of the edge computing sites 104 at the same time, or to different ones of the edge computing sites 104 at different times. Additionally or alternatively, one or more of the end-user devices 106 may be coupled to at least one of the one or more core computing sites 102.

The one or more core computing sites 102 may each comprise one or more data centers or other types and arrangements of core nodes. The edge computing sites 104 may each comprise one or more edge stations or other types and arrangements of edge nodes. Each such node or other computing site comprises at least one processing device that includes a processor coupled to a memory.

The end-user devices 106 are illustratively implemented as respective computers or other types and arrangements of processing devices. Such processing devices can include, for example, desktop computers, laptop computers, tablet computers, mobile telephones, Internet of Things (IoT) devices, or other types of processing devices, as well as combinations of multiple such devices. One or more of the end-user devices 106 can additionally or alternatively comprise virtualized computing resources, such as virtual machines (VMs), containers, etc. Although the end-user devices 106 are shown in the figure as being separate from the edge computing sites 104, this is by way of illustrative example only, and in other embodiments one or more of the end-user devices 106 may be considered part of their corresponding edge computing sites 104 and may in some embodiments comprise a portion of the edge resources of those corresponding edge computing sites 104.

The end-user devices 106 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing devices are possible, as will be appreciated by those skilled in the art.

The system 100 comprising the one or more core computing sites 102, the edge computing sites 104 and the end-user devices 106 is an example of what is more generally referred to herein as an "edge utility system." Other examples of edge utility systems are described elsewhere herein, and the term is intended to be broadly construed to encompass, for example, various arrangements in which usage of edge resources by system users can be metered or otherwise controlled in conjunction with dynamic aggregation of edge resources for execution of workloads on behalf of such users.

The one or more core computing sites 102 illustratively comprise at least one data center implemented at least in part utilizing cloud infrastructure. Each of the edge computing sites 104 illustratively comprises a plurality of edge devices and at least one edge utility meter configured to measure utilization of the edge devices of that edge computing site by one or more of the users in the edge utility system.

The term "user" herein is intended to be broadly construed so as to encompass numerous arrangements of human, hardware, software or firmware entities, as well as combinations of such entities. References herein to users "in" an edge utility system are intended to be broadly construed, so as to encompass, for example, users that are physically located external to the edge utility system but are associated with that system by, for example, registering with the system to provide or access edge resources in the manner disclosed herein.

Compute, storage and/or network services may be provided for users in some embodiments under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other arrangements could be used.

Although not explicitly shown in FIG. 1, one or more networks are assumed to be deployed in system 100 to interconnect the one or more core computing sites 102, the edge computing sites 104 and the end-user devices 106. Such networks can comprise, for example, a portion of a global computer network such as the Internet, a wide area network (WAN), a local area network (LAN), a satellite network, a telephone or cable network, a cellular network such as 4G or 5G network, a wireless network such as a WiFi or WiMAX network, or various portions or combinations of these and other types of networks. The system 100 in some embodiments therefore comprises combinations of multiple different types of networks. Such networks can support inter-device communications utilizing Internet Protocol (IP) and/or a wide variety of other communication protocols.

In some embodiments, a first type of network (e.g., a public network) couples the end-user devices 106 to the edge computing sites 104, while a second type of network (e.g., a private network) couples the edge computing sites 104 to the one or more core computing sites 102, although numerous other arrangements can be used.

The one or more core computing sites 102 and the edge computing sites 104 illustratively execute at least portions of various workloads for system users. Such workloads may comprise one or more applications. As used herein, the term "application" is intended to be broadly construed to encompass, for example, microservices and other types of services implemented in software executed by the sites 102 or 104. Such applications can include core-hosted applications running on the one or more core computing sites 102 and edge-hosted applications running on the edge computing sites 104.

Workloads comprising such applications or portions thereof are assumed to be executed at least in part utilizing dynamically aggregated edge resources, as will now be now be described in more detail.

In system 100, the edge computing sites 104-1, 104-2, . . . 104-N comprise respective sets of edge compute, storage and/or network resources 108-1, 108-2, . . . 108-N. A given such set of edge resources illustratively comprises at least one of compute, storage and network resources of one or more edge devices of the corresponding edge computing site. The edge computing sites 104 further comprise respective instances of edge resource aggregation logic 110-1, 110-2, 110-N. Similarly, the one or more core computing sites 102 comprise one or more sets of core compute, storage and/or network resources 108-C and one or more instances of edge resource aggregation logic 110-C.

Edge compute resources of the edge computing sites 104 can include, for example, various arrangements of processors, possibly including associated accelerators, as described in more detail elsewhere herein.

Edge storage resources of the edge computing sites 104 can include, for example, one or more storage systems or portions thereof that are part of or otherwise associated with the edge computing sites 104. A given such storage system may comprise, for example, all-flash and hybrid flash storage arrays, software-defined storage systems, cloud storage systems, object-based storage system, and scale-out distributed storage clusters. Combinations of multiple ones of these and other storage types can also be used in implementing a given storage system in an illustrative embodiment.

Edge network resources of the edge computing sites 104 can include, for example, resources of various types of network interface devices providing particular bandwidth, data rate and communication protocol features.

One or more of the edge computing sites 104 each comprise a plurality of edge devices, with a given such edge device comprising a processing device that includes a processor coupled to a memory. Such edge computing sites 104 also illustratively include at least one edge utility meter configured to measure utilization of the edge devices of that edge computing site by one or more of the users. The edge utility meter, which is not explicitly shown in this figure, is in some embodiments implemented as part of the corresponding instance of the edge resource aggregation logic 110 in a given one of the edge computing sites 104. In other embodiments, separate edge utility meters can be provided for each of a plurality of edge devices within a given one of the edge computing sites 104. For example, in some embodiments, one or more edge utility meters are implemented directly on each of at least a subset of the edge devices of each of the edge computing sites 104, although numerous other arrangements are possible.

The one or more core computing sites 102 of the system 100 may comprise, for example, at least one data center implemented at least in part utilizing cloud infrastructure. It is to be appreciated, however, that illustrative embodiments disclosed herein do not require the use of cloud infrastructure.

The instances of edge resource aggregation logic 110 are collectively configured to implement functionality for dynamic aggregation of edge resources of the edge computing sites 104 in system 100.

For example, in some embodiments, at least one processing device of the system 100, which may be part of the one or more core computing sites 102 and/or the edge computing sites 104, is illustratively configured to receive inputs for respective users in the system 100, with at least a first one of the inputs for a first one of the users characterizing edge resources requested by that user for executing at least a portion of a workload of that user, and at least a second one of the inputs for a second one of the users characterizing edge resources available from that user for executing at least a portion of a workload of another user. The at least one processing device is further configured to populate one or more data structures based at least in part on the plurality of inputs received for the respective users, to aggregate edge resources of multiple ones of the edge computing sites into an edge network based at least in part on the populated data structures, and to utilize at least a portion of the aggregated edge resources of the edge network to execute at least a portion of a workload of a particular one of the users.

Such operations in some embodiments represent an example algorithm performed by one or more instances of the edge resource aggregation logic 110 in one or more of the core computing sites 102 and/or edge computing sites 104. The algorithm is illustratively implemented utilizing processor and memory components of at least one processing platform that includes the at least one processing device. For example, at least portions of the edge resource aggregation logic 110 may be implemented at least in part in the form of software that is stored in memory and executed by a processor.

The term "edge network" as used herein is intended to be broadly construed, so as to encompass, for example, an arrangement of aggregated edge resources of different ones of the edge computing sites 104 configured for performance of one or more workloads or portions of combinations thereof.

In some embodiments, the aggregated edge resources of the edge network are arranged in a multi-level hierarchy with communication of information between levels of the hierarchy being handled by corresponding controllers implemented at respective ones of those levels. For example, edge devices or corresponding edge resources at a relatively low level of the hierarchy can communicate as a group via an associated local controller with edge devices or corresponding edge resources at a relatively high level of the hierarchy. Each such level can therefore have its own corresponding local controller that controls the particular edge devices or associated edge resources at that level.

Figure 7:
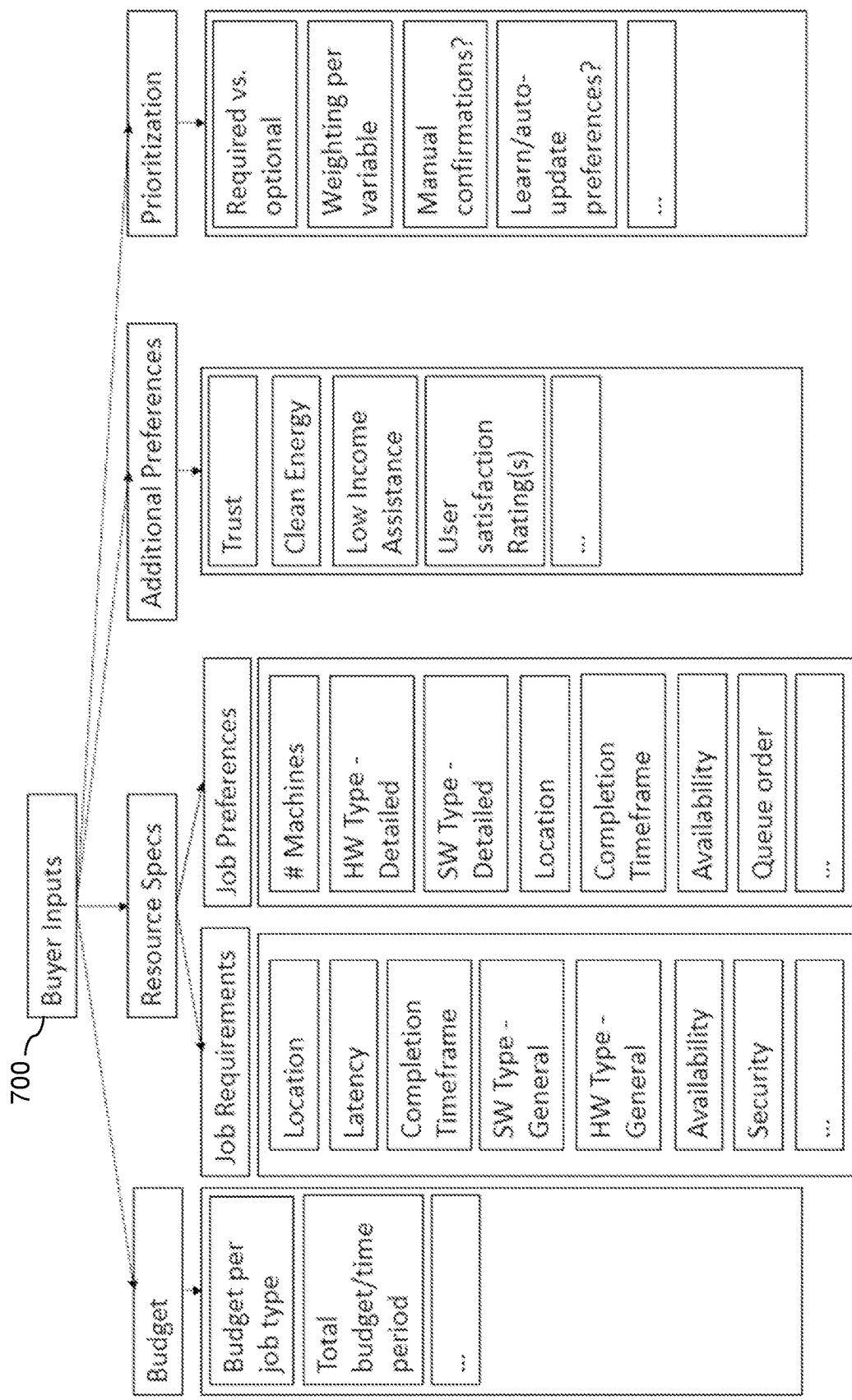
FIGS. 7 and 8 show respective examples of buyer and seller inputs in an edge utility system in an illustrative embodiment.
Figure 8:
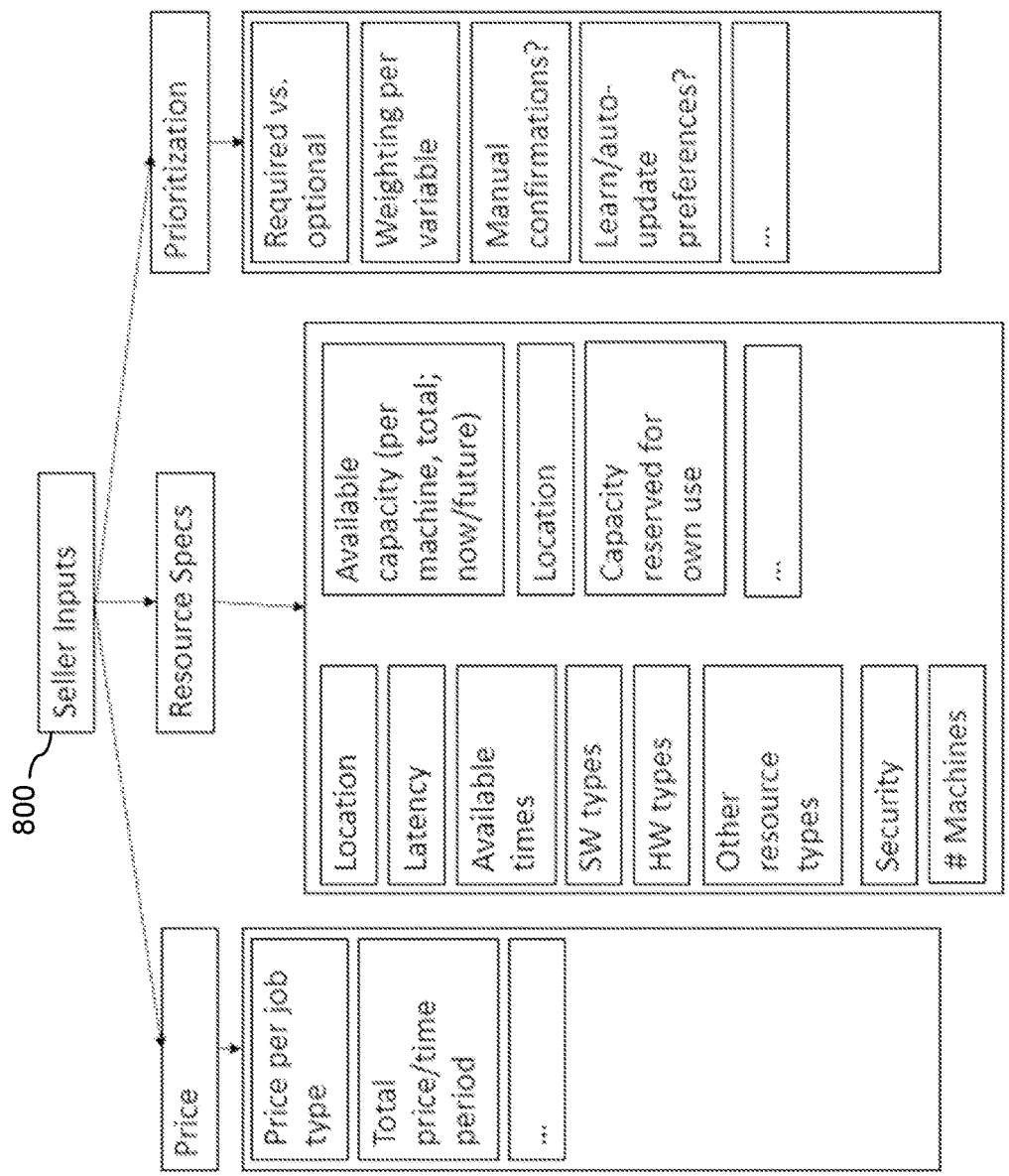

Detailed examples of the above-noted inputs provided by users in the system 100 are described elsewhere herein, such as in conjunction with the illustrative embodiments of FIGS. 7 and 8 which are described in a context in which the first and second users more particularly comprise respective buyers and sellers of edge resource capacity. Numerous other contexts utilizing edge resource aggregation can be supported in the system 100 utilizing the dynamic aggregation techniques disclosed herein.

By way of illustrative example only, the first input for the first user in some embodiments comprises at least one of a trust indicator specifying a trust level for providers of edge resources for executing at least a portion of the workload of that user, and an energy efficiency indicator specifying an energy efficiency level for providers of edge resources for executing at least a portion of the workload of that user. In such an arrangement, the first user can ensure that any provider of edge resources to a pool of dynamically aggregated edge resources that will be used to execute at least a portion of a workload of that user will have at least the requisite trust level and/or energy efficiency level. Additional or alternative indicators of particular user preferences can be provided as part of the first input.

Other users such as the second user that provide edge resources can have their trust level and/or energy efficiency level verified within the system 100, possibly based at least in part on monitoring performed by edge utility meters in the edge computing sites 104 in combination with other verification techniques. It should be noted in this regard that a given user can be both a provider of edge resources to other users as well as an acquirer of edge resources from other user, possibly at different times or under other conditions.

In some embodiments, aggregating edge resources of multiple ones of the edge computing sites 104 into an edge network based at least in part on the populated data structures comprises aggregating edge resources from different edge computing sites 104 at different geographic locations to form the edge network. For example, forming the edge network illustratively comprises forming a first edge network utilizing edge resources from a first set of edge computing sites at respective geographic locations, and forming a second edge network utilizing edge resources from a second set of edge computing sites at respective geographic locations. The first and second edge networks may overlap with one another at one or more of the geographic locations. An example of an edge utility system with multiple overlapping edge networks will be described below in conjunction with FIG. 5.

Additionally or alternatively, aggregating edge resources of multiple ones of the edge computing sites into an edge network based at least in part on the populated data structures illustratively comprises comparing characteristics from the first input for the first user to characteristics from the second input for the second user, and matching one or more edge resources requested by the first user with one or more edge resources available from the second user based at least in part on the comparing. The aggregated edge resources of the edge network illustratively comprise the one or more edge resources available from the second user that match the one or more edge resources requested by the first user.

In some embodiments, the at least one processing device is illustratively configured to monitor at least one edge utility meter for each of one or more edge devices of each of at least a subset of the edge computing sites 104. The edge utility meter is configured to provide metrics measuring utilization of edge resources of its corresponding edge device or set of multiple edge devices.

The edge utility meter in some embodiments is periodically updated in conjunction with execution of at least a portion of the workload of the particular one of the users utilizing aggregated edge resources that include one or more edge resources of its corresponding edge device or set of edge devices.

In some embodiments, each of the edge computing sites is configured to broadcast updates regarding its edge resources to at least one scheduler that controls workload execution utilizing the aggregate edge resources of the edge network. Such a scheduler can be implemented at least in part in one or more instances of the edge resource aggregation logic 110. For example, it can be implemented as a centralized scheduler in the edge resource aggregation logic 110-C of the one or more core computing sites 102, or can be implemented as a distributed scheduler utilizing the instances of edge resource aggregation logic 110-1 through 110-N in the respective edge computing sites 104. Hybrid centralized/distributed arrangements can also be used to implement the scheduler. Other types of controllers referred to herein can be similarly implemented using instances of the edge resource aggregation logic 110.

These and other features and functionality of the system 100 are illustratively implemented at least in part by or under the control of at least a subset of the instances of edge resource aggregation logic 110. The at least one processing device referred to above and elsewhere herein illustratively comprises one or more processing devices that implement respective instances of the edge resource aggregation logic 110.

Although shown as an element of the one or more core computing sites 102 and the edge computing sites 104 in this embodiment, the edge resource aggregation logic 110 in other embodiments can be implemented at least in part externally to the one or more core computing sites 102 and the edge computing sites 104, for example, as a stand-alone server, set of servers or other type of system coupled via one or more networks to the one or more core computing sites 102 and/or the edge computing sites 104. In some embodiments, the edge resource aggregation logic 110 may be implemented at least in part within one or more of the end-user devices 106 and/or in other system components.

The one or more core computing sites 102 and the edge computing sites 104 in the FIG. 1 embodiment are each assumed to be implemented using at least one processing device of at least one processing platform. Each such processing device generally comprises at least one processor and an associated memory, and implements at least a portion of the functionality of the edge resource aggregation logic 110.

It is to be appreciated that the particular arrangement of the one or more core computing sites 102, the edge computing sites 104, the end-user devices 106, the core and edge compute, storage and/or network resources 108 and the edge resource aggregation logic 110 illustrated in the FIG. 1 embodiment is presented by way of example only, and alternative arrangements can be used in other embodiments. As discussed above, for example, the edge resource aggregation logic 110 may be implemented external to one or both of the one or more core computing sites 102 and the edge computing sites 104.

It is also to be understood that the particular set of elements shown in FIG. 1 for dynamic aggregation of edge resources across multiple ones of the edge computing sites 104 utilizing edge resource aggregation logic 110 is presented by way of illustrative example only, and in other embodiments additional or alternative elements may be used. Thus, another embodiment may include additional or alternative systems, devices and other entities, as well as different arrangements of modules and other components.

The one or more core computing sites 102, the edge computing sites 104, the end-user devices 106 and other portions of the system 100, as described above and in further detail below, may be part of cloud infrastructure.

The one or more core computing sites 102, the edge computing sites 104, the end-user devices 106 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The one or more core computing sites 102, the edge computing sites 104, and the end-user devices 106, or components thereof, may be implemented on respective distinct processing platforms, although numerous other arrangements are possible. For example, in some embodiments, at least portions of the end-user devices 106 and the edge computing sites 104 are implemented on the same processing platform. One or more of the end-user devices 106 can therefore be implemented at least in part within at least one processing platform that implements at least a portion of the edge computing sites 104 and/or the one or more core computing sites 102. Accordingly, in some embodiments, at least a portion of the end-user devices 106 can be coupled to the one or more core computing sites 102, in addition to or in place of being coupled to at least one of the edge computing sites 104.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the one or more core computing sites 102, the edge computing sites 104 and the end-user devices 106, or portions or components thereof, to reside in different data centers. Numerous other distributed implementations are possible.

Additional examples of processing platforms utilized to implement the one or more core computing sites 102, the edge computing sites 104, the end-user devices 106, and possibly additional or alternative components of the system 100 in illustrative embodiments will be described in more detail below in conjunction with FIGS. 10 and 11.

It is to be appreciated that these and other features of illustrative embodiments are presented by way of example only, and should not be construed as limiting in any way.

An exemplary process for dynamic aggregation of edge resources across multiple edge computing sites will now be described in more detail with reference to the flow diagram of FIG. 2. It is to be understood that this particular process is only an example, and that additional or alternative processes for dynamic aggregation of edge resources across multiple edge computing sites may be used in other embodiments.

In this embodiment, the process includes steps 200 through 206. These steps are assumed to be performed by the one or more core computing sites 102 and the edge computing sites 104 utilizing their respective instances of edge resource aggregation logic 110, although it is to be appreciated that other arrangements of edge utility system components can implement this or other similar processes in other embodiments. In some embodiments, the FIG. 2 process more particularly represents an example algorithm performed at least in part by one or more instances of edge resource aggregation logic 110 in system 100.

In step 200, inputs are received for respective users in an edge utility system that includes multiple edge computing sites coupled to one or more core computing sites. The edge utility system may include only a single core computing site, or multiple core computing sites. The edge computing sites are coupled to the one or more core computing sites via one or more networks. The edge computing sites may each comprise one or more edge stations or other types and arrangements of edge nodes. The one or more core computing sites may each comprise one or more data centers or other types and arrangements of core nodes. Each such node or other computing site comprises at least one processing device that includes a processor coupled to a memory. With regard to the received inputs, at least a first one of the inputs for a first one of the users characterizes edge resources requested by that user for executing at least a portion of a workload of that user, and at least a second one of the inputs for a second one of the users characterizes edge resources available from that user for executing at least a portion of a workload of another user. Additional or alternative inputs can be received for these or other users in other embodiments. It should be noted in this regard that each of the first and second users need not have workloads to execute in the edge utility system. For example, in some embodiments, the first user has a workload to execute, but the second user is a supplier who has acquired edge resources from at least a third user, and resells those edge resources for use in executing a workload of a fourth user. Such a supplier is considered an example of a "user" of an edge utility system as that term is broadly used herein.

In step 202, one or more data structures are populated based at least in part on the plurality of inputs received for the respective users in the edge utility system. For example, a separate set of one or more data structures can be populated for each of the first user and the second user. As a more particular example, such data structures can include at least portions of the example data structures shown in FIGS. 7 and 8 for the first user and the second user illustratively acting as a buyer of edge resources and a seller of edge resources, respectively, although terms such as "buyer" and "seller" as used herein in the context of users in an edge utility system are intended to be broadly construed, and should not be viewed as requiring exchange of funds or other types of payments.

In step 204, edge resources of multiple ones of the edge computing sites are aggregated into an edge network based at least in part on the populated data structures. For example, an "edge network" as the term is broadly used herein can include designated edge resources of multiple edge computing sites that are configured to interact with one another to support workload execution for one or more users in the edge utility system.

In step 206, at least a portion of the aggregated edge resources of the edge network are utilized to execute at least a portion of a workload of a particular one of the users. For example, at least a portion of the aggregated edge resources made available by the second user acting as a seller of edge resources may be utilized to execute at least a portion of a workload of the first user acting as a buyer of edge resources. A wide variety of other workload execution arrangements utilizing aggregated edge resources can be additionally or alternatively implemented in illustrative embodiments herein. The term "workload" as used herein is intended to be broadly construed so as to encompass, for example, one or more applications that are executed at least in part utilizing aggregated edge resources.

Figure 2:
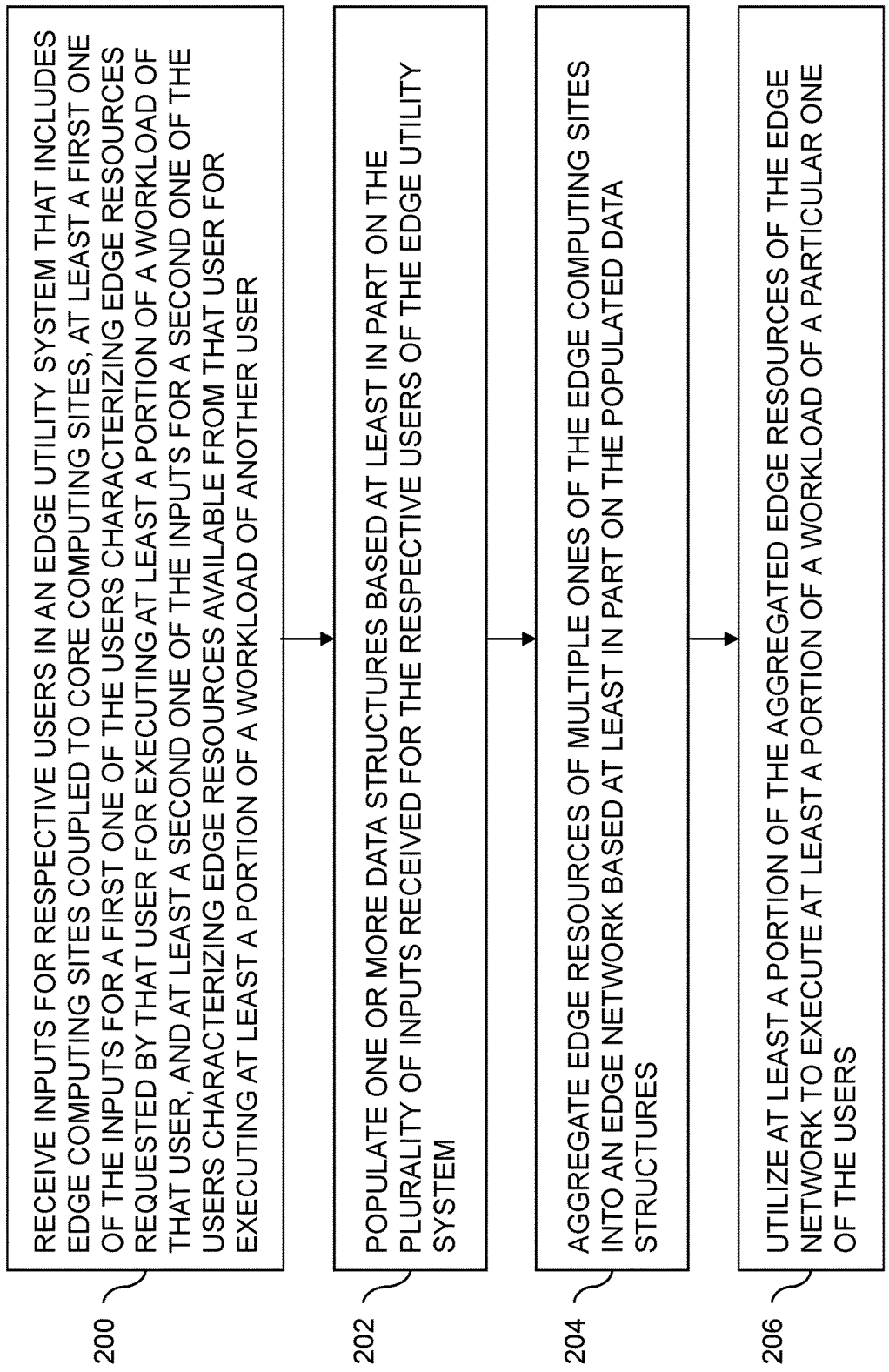
FIG. 2 is a flow diagram of an exemplary process for dynamic aggregation of edge resources across multiple edge computing sites in an illustrative embodiment.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving core computing sites, edge computing sites and functionality for dynamic aggregation of edge resources across multiple edge computing sites. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different aggregated arrangements of edge resources within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Additional illustrative embodiments will now be described with reference to FIGS. 3 through 9. In these embodiments, users including the above-noted first and second users are more particularly referred to as examples of respective "buyers" and "sellers" of edge resources, although those terms are intended to be broadly construed herein, and should not be viewed as requiring particular features such as exchange of funds. References herein to buyers and sellers can be more generally understood to refer to respective resource-acquiring users and resource-providing users, with respect to acquiring or providing edge resources for execution of workloads on behalf of a given such user or other system users.

As indicated previously, in some embodiments, the one or more core computing sites 102 are implemented using cloud infrastructure. Cloud computing provides a number of advantages, including but not limited to playing a significant role in making optimal decisions while offering the benefits of scalability and reduced cost. Edge computing implemented using the edge computing sites 104 provides another option, typically offering faster response time and increased data security relative to cloud computing. Rather than constantly delivering data back to one or more of the core computing sites 102, which may be implemented as or within a cloud data center, edge computing enables devices running at the edge computing sites 104 to gather and process data in real-time, allowing them to respond faster and more effectively. The edge computing sites 104 in some embodiments interact with the one or more core computing sites 102 implemented as or within a software-defined data center (SDDC), a virtual data center (VDC), or other similar dynamically-configurable arrangement, where real-time adjustment thereof based on workload demand at edge computing sites 104 is desired.

By incorporating edge computing with centralized cloud computing, an entity can maximize the potential of both approaches while minimizing their limitations. Finding the right balance between edge and cloud computing, however, is a major issue for entities that utilize hybrid edge and cloud computing environments.

Different edge computing sites may have different amounts of resources (e.g., compute, storage and network resources). Further, even if two edge computing sites have the same resources, they may have different associated workload status at different points in time depending on real-time data processing streams.

Edge computing sites typically have limited compute and storage resources as compared to a core computing site (e.g., a cloud data center). End-users may want applications to be suitably distributed between the edge computing sites and the core computing site on demand to maximize the resources of the edge computing sites.

A technical problem that arises in some conventional arrangements is that such arrangements fail to provide a sufficiently efficient and flexible solution to meeting demands of variable workloads from a potentially large number of users. In addition, users that may have available edge resources are often unable to make those resources readily accessible for utilization by workloads of other users.

Illustrative embodiments disclosed herein allow edge users to find each other to buy and sell capacity (e.g., compute accelerators, storage devices, network bandwidth, etc.) based on personalized requirements (e.g., not just based on price). Such embodiments enable a system of buying and selling based on factors other than the highest bid, thereby ensuring that buyers with fewer resources are not locked out of the market. It also allows users to focus on other, non-financial preferences (e.g., location, speed, power consumption, trust, energy efficiency, etc.)

Many edge users have excess edge capacity (e.g., compute accelerators, storage devices, network bandwidth, etc.) or need excess edge capacity. Some embodiments herein enable users to buy and sell excess edge capacity through a coordinated marketplace, thereby effectively providing an edge utility as a service. Such arrangements open up access to buyers who are not necessarily the highest bidder in an auction sense, and enable buyers and sellers to input purchase/sales preferences based on factors other than cost.

The edge utility market provides the ability of infrastructure providers (e.g., ideally at edge locations) to join a dynamic pool of available resources to facilitate a network of aggregated edge computing capability. This edge network will grow (and potentially shrink, although that would typically be less likely) as more providers join the pool of edge resources. Collectively, the resources of these providers will be aggregated based on location and/or other factors and made available to edge application developers based on a well-defined set of criteria.

Illustrative embodiments disclosed herein enable users to define and configure energy efficiency requirements and other preferences for edge utility transactions in an edge utility market and in other system contexts. Such an arrangement also enables automatic generation of energy efficiency and environmental impact ratings, as well as other related information characterizing edge resource deployments.

Figure 3:
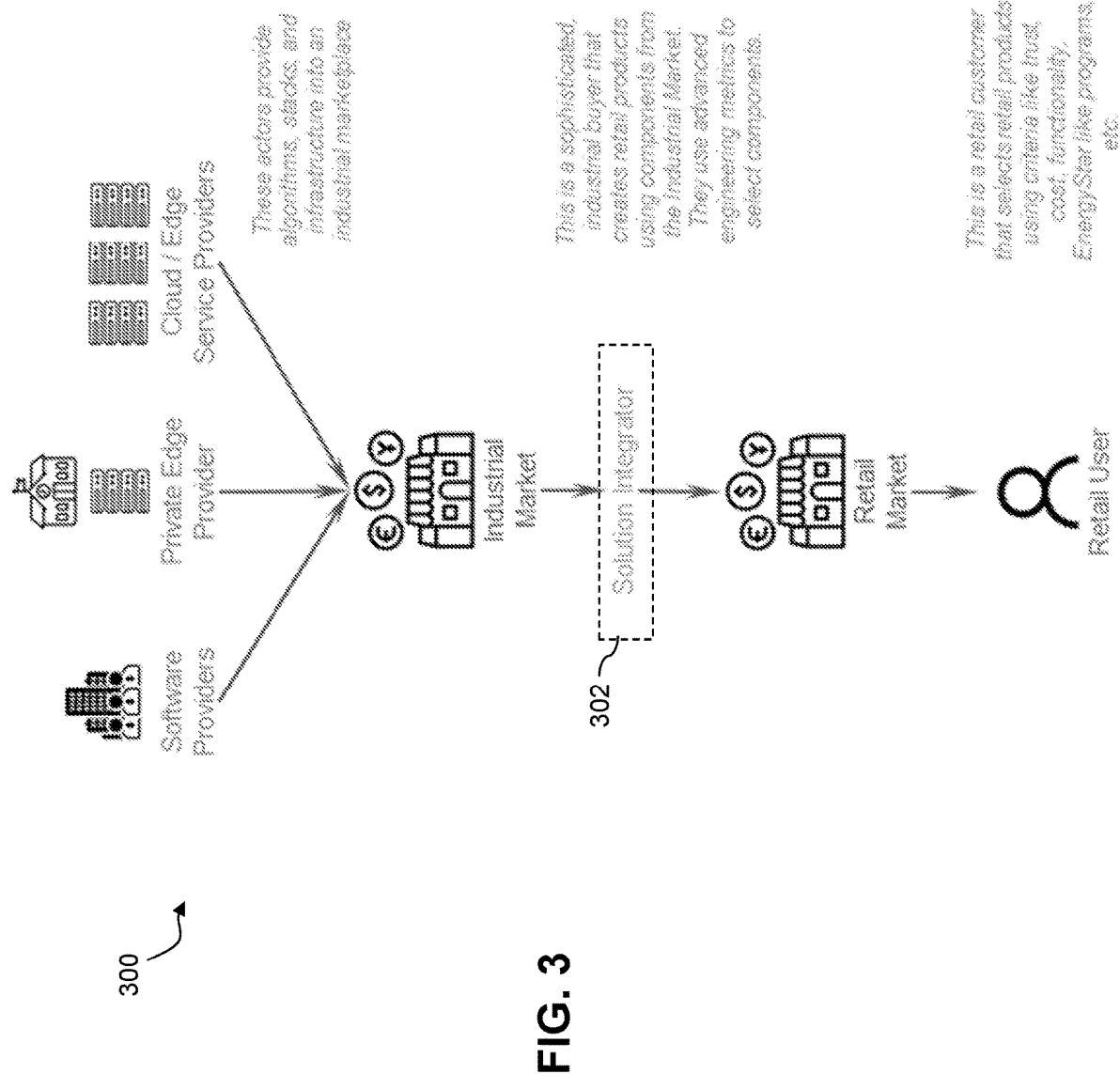
FIG. 3 shows example persona relationships among multiple distinct participants in an edge utility system in an illustrative embodiment.

FIG. 3 depicts example system entities of an illustrative edge utility system 300 and shows the interactions and ownership boundaries between such entities in the edge utility system 300. It is to be appreciated that the particular system entities illustrated in this figure are presented by way of example only, and additional or alternative parties or other entities may be part of edge utility system 300 or other edge utility systems in other embodiments. Such system entities include examples of various types of "users" of an edge utility system. A given such user illustratively has at least one corresponding persona corresponding to its entity type, although a given user can have multiple such personas, for example, at different times and/or sequentially. Additional or alternative users can be present in other embodiments, and the term "user" is intended to be broadly construed herein.

The users in the edge utility system 300 in this embodiment include software providers, private edge providers, cloud service providers and edge service providers, the latter service providers being collectively referred to as cloud/edge service providers. The software providers, private edge providers and cloud/edge service providers illustratively provide algorithms, stacks and infrastructure into an industrial market.

The software providers illustratively develop and deploy software that could be utilized by end-users. The software providers may provide components into the industrial market and/or serve as vendors in a retail market that interacts with retail users.

The private edge providers illustratively have hardware in their private domains for their own use cases. Some examples include homeowners, school administrators, IT departments in businesses or other enterprises, etc. In some embodiments, the private edge providers provide edge infrastructure into the industrial market.

The cloud service providers and edge service providers illustratively interact with the industrial market. For example, cloud service providers can provide PaaS, IaaS, FaaS and/or STaaS offerings from their respective datacenters.

The industrial market provides space to match buyers with sellers and/or resellers of edge infrastructure. This could be either an auction house type of organization, or more like a utility provider where there is a default to a certain price (e.g., based on regulations, demand, etc.) In some cases, the edge utility market is a reseller (e.g., purchasing—or already owning—the resources and reselling them). In other cases, it serves as an edge resource matchmaker, without ever owning the resources.

The example parties above interact in the industrial market, undergoing a matchmaking process based on their requirements, buyer preferences, and local laws and regulations.

The industrial market may be viewed as an example of what is more generally referred to herein as an "edge utility market." As indicated previously, such a market illustratively provides the ability of infrastructure providers (e.g., at edge locations) to join a dynamic pool of available resources to facilitate a network of aggregated edge computing capability, where the pool can grow dynamically over time as more providers join the pool of edge resources. Collectively, the resources of these providers will be aggregated based on location and/or other factors and made available to edge application developers based on a well-defined set of criteria.

This autonomous, growing, self-configuring pool of edge resources in illustrative embodiments disclosed herein is orchestrated and regulated by one or more solution integrators 302. Value grows as the networks of edge resource pools grow autonomously, with their usage by edge application providers driven by their aggregated value as a utility, similar to the energy utility grid.

The solution integrators 302 are illustratively sophisticated, industrial buyers that create retail products using components from the industrial market. They use advanced engineering metrics to select components. They select edge services and match such services with software to create retail products for retail users. These services and software can run on a wide variety of different types of infrastructure, and are configured to provide an improved user experience for corresponding end-users. In some embodiments, the solution integrators 302 are potential buyers of edge infrastructure.

The retail market is where retail customers can select retail products using criteria such as trust, cost, functionality, EnergyStar-like programs, etc. It is possible for a particular user to operate as more than one entity type within the edge utility system, at the same time and/or sequentially.

In some embodiments, sellers sell to buyers, with the industrial market or other edge utility market acting as an edge resource matchmaker. For example, producers illustratively sell to the edge utility market, which sells to buyers. In some embodiments, producers and the edge utility market are the same entity.

The edge utility system illustratively comprises an edge utility marketplace and may specialize in a particular purchasing decision philosophy (e.g., prioritizing energy efficiency or trust) or in multiple distinct philosophies at the same time. The edge utility system can also specialize in one or more types of resources (e.g., compute accelerators, storage devices, network bandwidth, etc.)

The edge utility market is responsible for connecting buyers and sellers. In some embodiments, this can include one or more of the following:
1. Matching buyers with sellers based on one or many potential variables (e.g., cost, latency, energy efficiency, trust, etc.) The number of variables and importance/weighting of each can vary based on the implementation.
2. Purchasing from sellers and reselling to buyers.
3. Enabling access to purchased resources (e.g., via APIs).
4. Verifying metering logs. For example, this can involve serving as a neutral third party between two users (e.g., buyers/sellers, producers/consumers or other types of users), or in cases where there is a conflict of interest (e.g., one party is a provider and a reseller), providing a neutral third party for metering verification.
5. Ensuring payments are made.
6. Setting prices in different regions (e.g., if regulations require doing so).
7. Calculating and displaying the current/future price of edge infrastructure.

Buyers can include, for example, groups such as application developers/owners, PaaS providers, IaaS providers, FaaS providers, STaaS providers, etc.

Sellers can include, for example, edge resource owners such as owners of edge devices (e.g., servers, computers, tablets, etc.) with excess compute capacity, accelerators, virtual machines, etc.

Once the edge utility market receives a request to buy or sell, the request goes into a queue in the edge utility system, where it is auto-sorted based on factors such as order of arrival in the queue, availability of resources, ability for the request to be split across various devices, and the user's preferences for how to prioritize bids.

Illustrative embodiments provide a flexible architecture that can add different priority areas for buying/selling. For example, some buyers/sellers may prioritize buying/selling from edge devices that are energy efficient, enable purchase of blocks of capacity in advance, or have high levels of trust (among other options). In determining who to buy from/sell to, users can be notified when a new option for prioritization becomes available.

In some embodiments, an edge utility marketplace comprises multiple levels, such as n tiers arranged in a hierarchy. For example, a local controller can handle information on behalf of its network devices (e.g., share the rollups on behalf of them all so each individual device does not need to deal directly with the centralized marketplace).

If a user wants to connect to more than one edge utility market, a corresponding setting is implemented such that other edge utility markets know what is already being bought/sold so there is no accidental double-buying/selling.

The marketplace can be divided into regions, each having different rates specified for one or more variables.

The resources being bought and sold can be actual resources, or credits for future resource availability.

Figure 4:
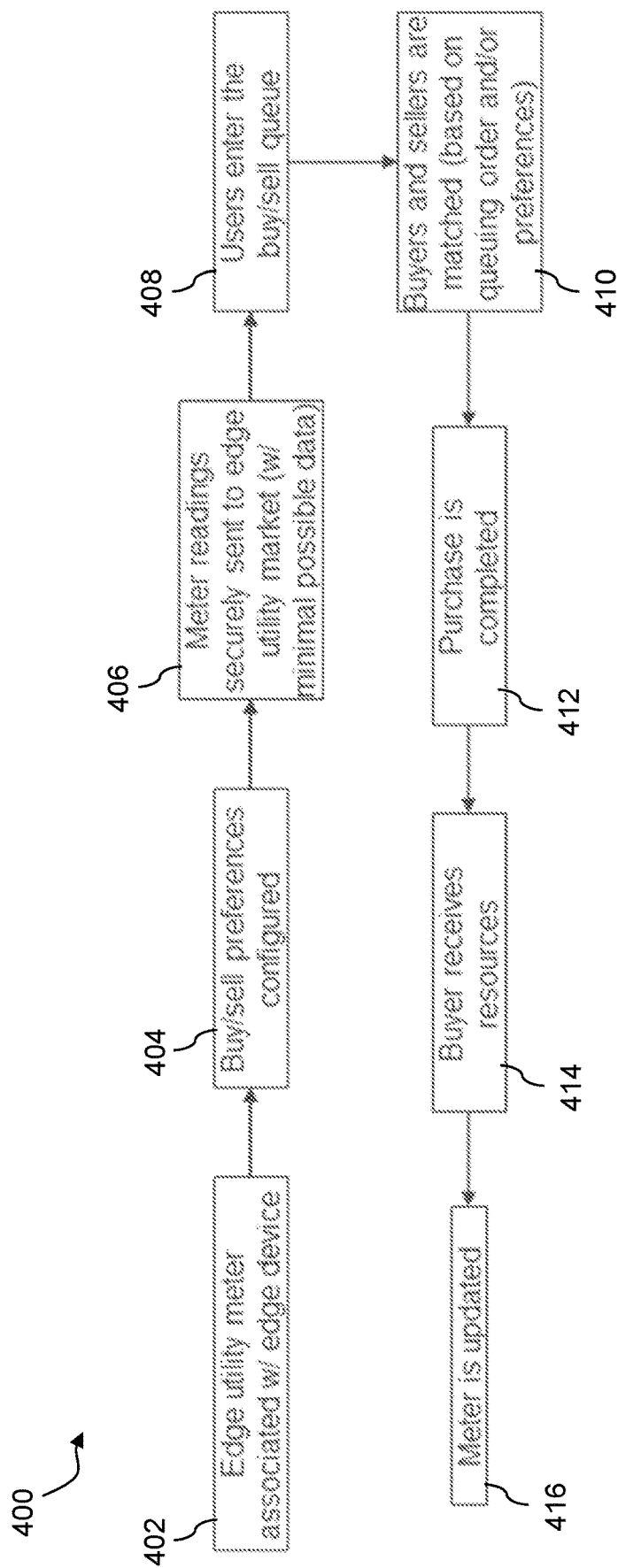
FIG. 4 shows example interactions between participants in an edge utility system in an illustrative embodiment.

FIG. 4 shows example interactions between participants in an edge utility system 400 in an illustrative embodiment. In this embodiment, an edge utility meter 402 is associated with an edge device of an edge computing site of a particular user. Similar edge utility meters are assumed to be associated with other edge devices of this user, and with edge devices of other users, including users in other edge computing sites. In some embodiments, such an arrangement can be used to allow users to share data across their own devices, although numerous other data sharing arrangements are supported using the disclosed techniques.

As shown at 404, buy/sell preferences are configured for the particular user, and as shown at 406, meter readings are securely sent to an edge utility market implemented by the edge utility system 400, illustratively using the minimal possible amount of user data. Users enter a buy/sell queue of the edge utility system 400, as shown at 408. The buyers and sellers are matched at 410 based on queuing order and/or their configured preferences. A purchase of matching edge resources is completed at 412, and the buyer receives the resources (e.g., obtains access to those resources for use in executing a workload of the buyer) at 414. One or more edge utility meters are updated as appropriate as indicated at 416.

Figure 5:
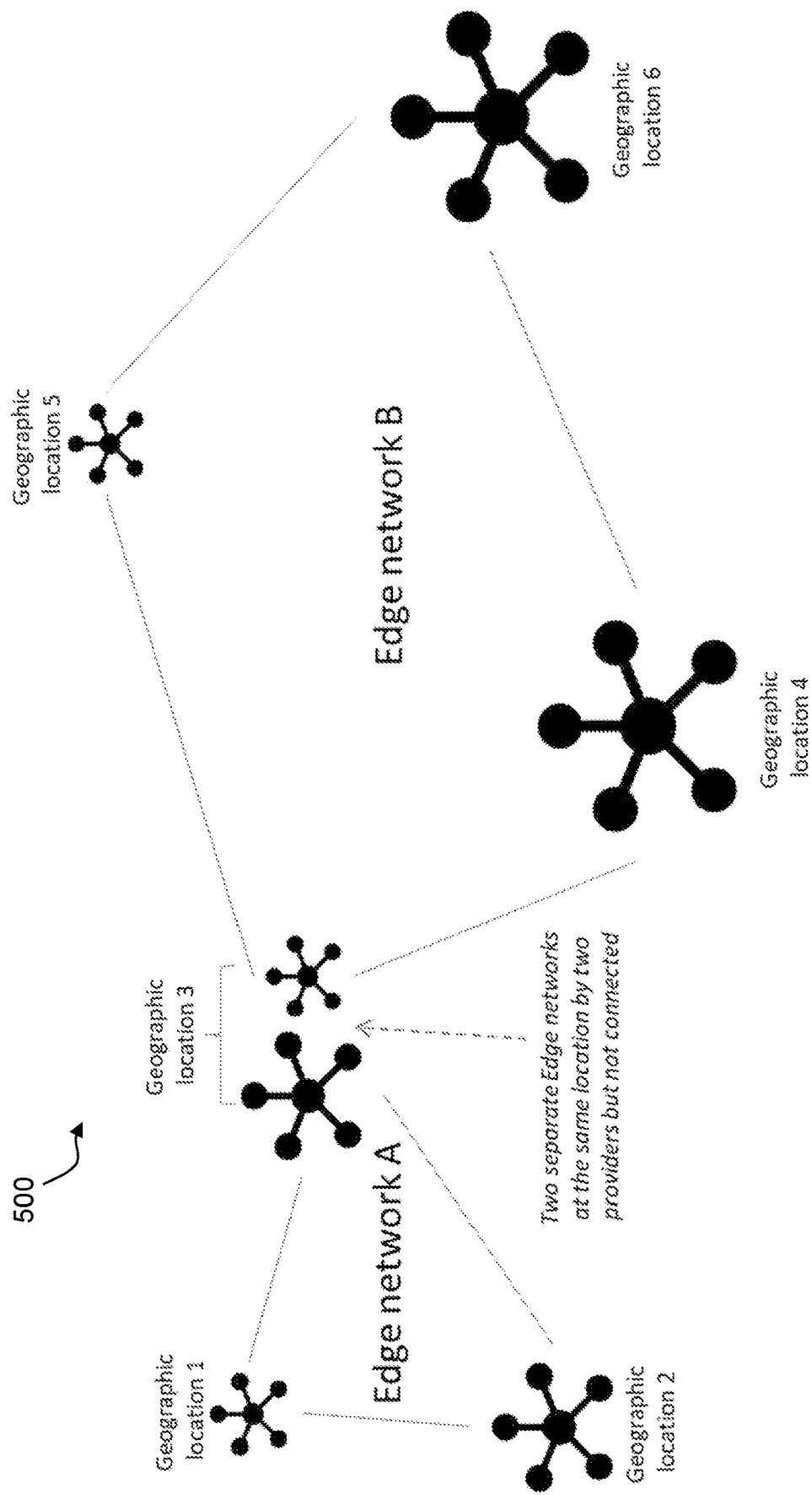
FIG. 5 shows multiple edge networks generated by aggregating edge resources at different geographic locations in an illustrative embodiment.

FIG. 5 depicts an energy utility system 500 in which multiple edge utility markets exist at least in part within the same geographic location. This is an example of an embodiment in which aggregating edge resources of multiple edge computing sites into an edge network comprises aggregating edge resources from different edge computing sites at different geographic locations to form the edge network. More particularly, in this example, a first edge network denoted as Edge Network A is formed utilizing edge resources from a first set of edge computing sites at respective geographic locations 1, 2 and 3, and a second edge network denoted as Edge Network B is formed utilizing edge resources from a second set of edge computing sites at respective geographic locations 3, 4, 5 and 6.

It can be seen that in this embodiment, the two separate edge networks overlap one another at geographic location 3, utilizing two different edge resource providers that are associated with that same geographic location but are not otherwise connected.

In these and other embodiments, a given user can sell or otherwise provide edge resources to more than one edge utility system.

Also, in these and other embodiments, users can switch back and forth between buying and selling, based on how close they get to certain thresholds (which can be preconfigured). A given user can also manually stop buying/selling if need be.

It is possible to be both a buyer and a seller at the same time, such as for different types of resources (e.g., compute accelerators, storage devices, network bandwidth, etc.)

The user can also choose to buy at certain prices and sell at certain prices (so they can be both buyers and sellers of capacity at different prices).

Buyers can look for resources over a longer period of time (e.g., a week or a month) in addition to real-time.

Sellers can charge more at different times, based on factors such as time period (e.g., time of day or season) or their own application status.

The purchase can include actual deployment capacity or future deployment capacity. It can also be at a set or variable price (e.g., at the moment of the transaction, or at the price when the actual exchange occurs).

The purchase can also include expansion capacity, which in some embodiments can be automatically resold if it is not used at the designated time.

In order to avoid unexpected work stoppages, users can preconfigure preferences for what to do when the price goes above their pre-set limit.

As indicated previously, in some embodiments, a meter assigned to an edge device is configured to communicate with an edge utility market (e.g., via a user's edge utility market profile; the user could be prompted to select an edge utility market provider in conjunction with configuration of the meter). The meter can be located on the user's physical device or somewhere else such as, for example, in the cloud or on another edge device.

The meter in some embodiments is configured to capture, store and emit metadata regarding the current status of a corresponding local edge device. For example, it can leverage techniques disclosed in U.S. patent application Ser. No. 17/451,782, filed Oct. 21, 2021 and entitled "Use of IO Event Metadata to Enable XaaS Billing and Analytics," which is incorporated by reference herein its entirety. Additionally or alternatively, such metadata can relate to accelerators, trust factors, energy efficiency, or any other information type. In some embodiments herein, the metadata is provided by the meter to one or more processing devices implementing an edge utility market.

Another possible way of validating the actual capacity is to require the user to install software that audits their availability, and/or whether they are selling to any other edge utility markets.

In some embodiments, portions of captured information can be obscured or redacted for security purposes.

Users can also configure their meters to capture, store and emit only the relevant metadata related to their buy/sell preferences (e.g., if they are only interested in buying based on certain characteristics in the supplier's configuration).

There can also be limits to how this information interacts with the supplier's machine and/or software. For example, it could be made available to the edge network provider, and/or to the edge utility market, but not to the device owner.

Figure 6:
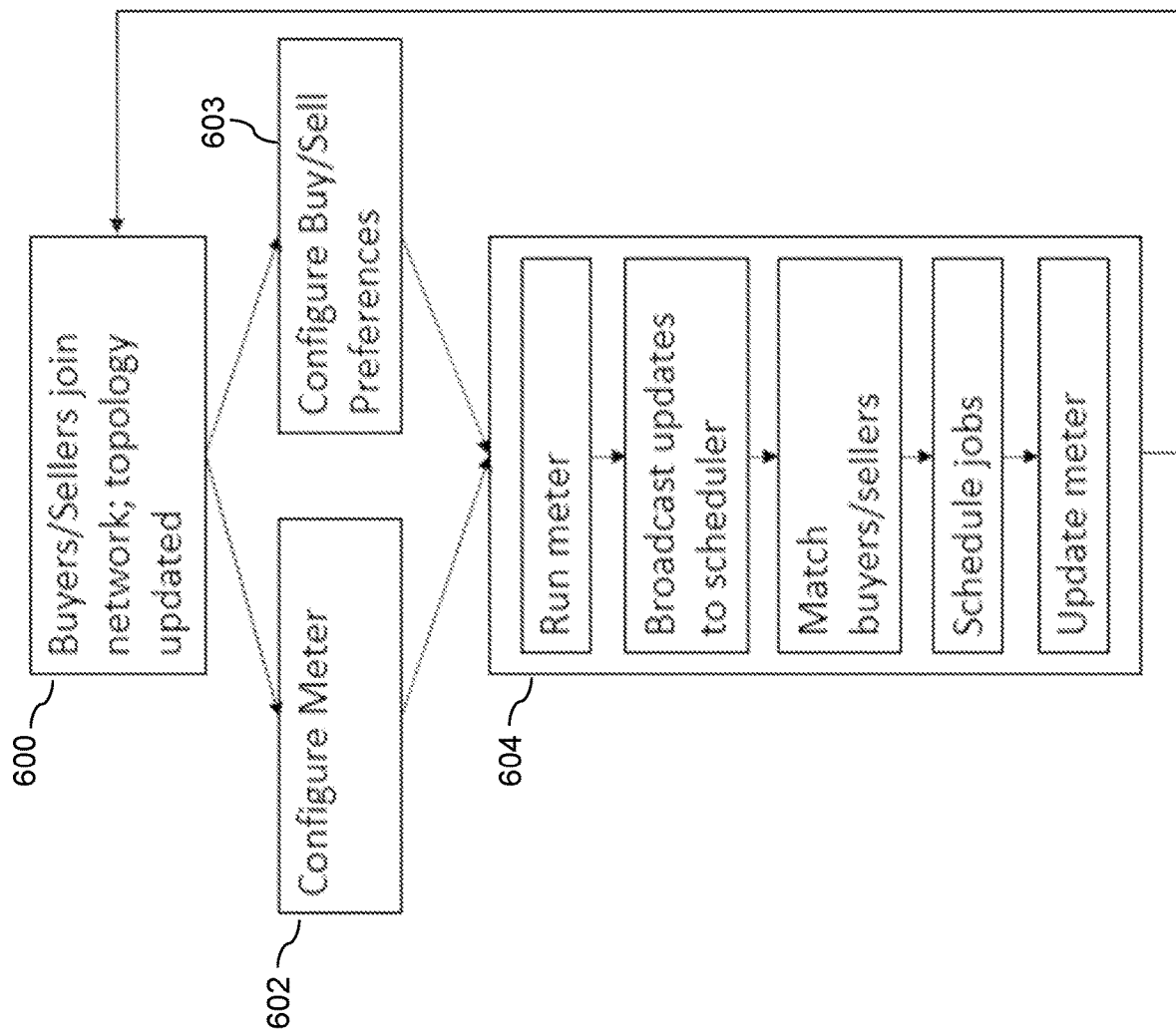
FIG. 6 is a flow diagram of an exemplary process for implementing an edge utility system using dynamic aggregation of edge resources across multiple edge computing sites in an illustrative embodiment.

FIG. 6 depicts an example process implemented in an edge utility system in an illustrative embodiment.

In step 600, buyers and sellers join the network, and the topology is updated. Such users can also leave the network at a subsequent time. In some cases, for example, this step may be implemented at least in part by having each joining user complete a profile and/or take other actions such as downloading software into an end-user device. Additionally or alternatively, it may be done by a local/corporate network.

In step 602, the meter is configured for each joining user. There can be multiple meters associated with each joining user, such as one meter for each edge device associated with that user, although numerous other metering arrangements are possible.

In step 603, the buy/sell preferences are configured for each joining user.

The configurations in steps 602 and 603 are illustratively performed at least in part by an end-user, and/or by an administrator.

In portion 604 of the FIG. 6 process, additional operations are performed, as follows. The one or more meters run for each user in the network, and broadcast updates to a scheduler of the edge utility system. The edge utility system then matches buyers and sellers. In some embodiments, where the edge utility market buys resources directly (or already owns them), this step would be replaced with matching buyers directly to available resources. Jobs are then scheduled, according to preferences and priorities as described elsewhere herein. As the scheduled jobs are run, booked or otherwise processed, the one or more meters are updated for each corresponding user.

After completion of the operations of portion 604, the process returns to step 600 as indicated. The topology can be checked regularly for buyers/sellers who have joined or left the network, and adjusted accordingly. Multiple instances of portion 604 can be performed sequentially or at least in part in parallel with one another, for different groups of users, different networks, etc.

FIG. 7 shows a number of examples of potential buyer inputs 700. The illustrated arrangement, or particular portions thereof, are considered examples of "data structures" as that term is broadly used herein. Accordingly, the buyer inputs 700 are illustratively captured and stored in one or more data structures. Additional or alternative inputs can be used in other embodiments. Buyers have the option to input one or more of several categories of requirements, as illustrated in the figure, including the following:

1. Budget. Examples include the budget per job type and the total budget per time period.
2. Resource Specifications ("Specs"). This illustratively includes job requirements, such as location, latency, completion time frame, software and/or hardware type, availability, and security requirements, and job preferences, such as the number of machines a job can be split across, detailed hardware and software types, location, completion time frame, and availability
3. Additional preferences. Examples include trust, clean energy usage, power consumption, low income assistance, user satisfaction ratings, and how long a seller agrees to maintain their status post-purchase (e.g., they commit to holding their power consumptions specs steady for the duration of the job or another specified period). Buyers can also specify weights for each preference. In some embodiments, the edge utility system can provide visibility into progress towards limits. For example, a user could be alerted and provided with an opportunity to change preferences or take other actions as limits are reached. Additionally or alternatively, one or more such actions can be taken automatically.
4. Prioritization. Examples include whether a feature is required versus optional, the weighting for each variable, whether manual confirmations will be required, and whether the user would like to leverage automated decision making.

Depending on the implementation, buyer inputs can be determined automatically based on prior user inputs, and/or based on historical data from other similar users.

Buyers can update their preferences regularly.

If the buyer does not specify any preferences, the preferences may be defaulted to certain settings depending on the implementation.

FIG. 8 shows a number of examples of potential seller inputs 800. The illustrated arrangement, or particular portions thereof, are also considered examples of "data structures" as that term is broadly used herein. Accordingly, the seller inputs 800 are illustratively captured and stored in one or more data structures. Again, additional or alternative inputs can be used in other embodiments.

Sellers also have the option to input one or more of several categories of requirements, as illustrated in the figure, including the following:

1. Price. Examples include the price per job and the total price per time.
2. Resource Specs. Examples include seller location, ability to meet buyer latency requirements, available times, software and hardware types, other resource types, ability to meet buyer security requirements, number of machines available, available capacity (per machine, total; now/future), and the amount of capacity reserved for the seller's own use.
3. Prioritization. Examples include whether buyer resource specs are required versus optional, the weighting per variable, whether manual confirmations are required, and whether the seller will enable auto updating of their preferences. There can also be a flag for high-priority jobs, such as helping to find missing people in a disaster.

Depending on the implementation, seller inputs can be determined automatically based on prior user inputs, and/or based on historical data from other similar users.

Sellers can update their preferences regularly.

If the seller does not specify any preferences, the preferences may be defaulted to certain settings depending on the implementation.

In some cases, the price will be automatically determined by the utility and/or by supply and demand.

Figure 9:
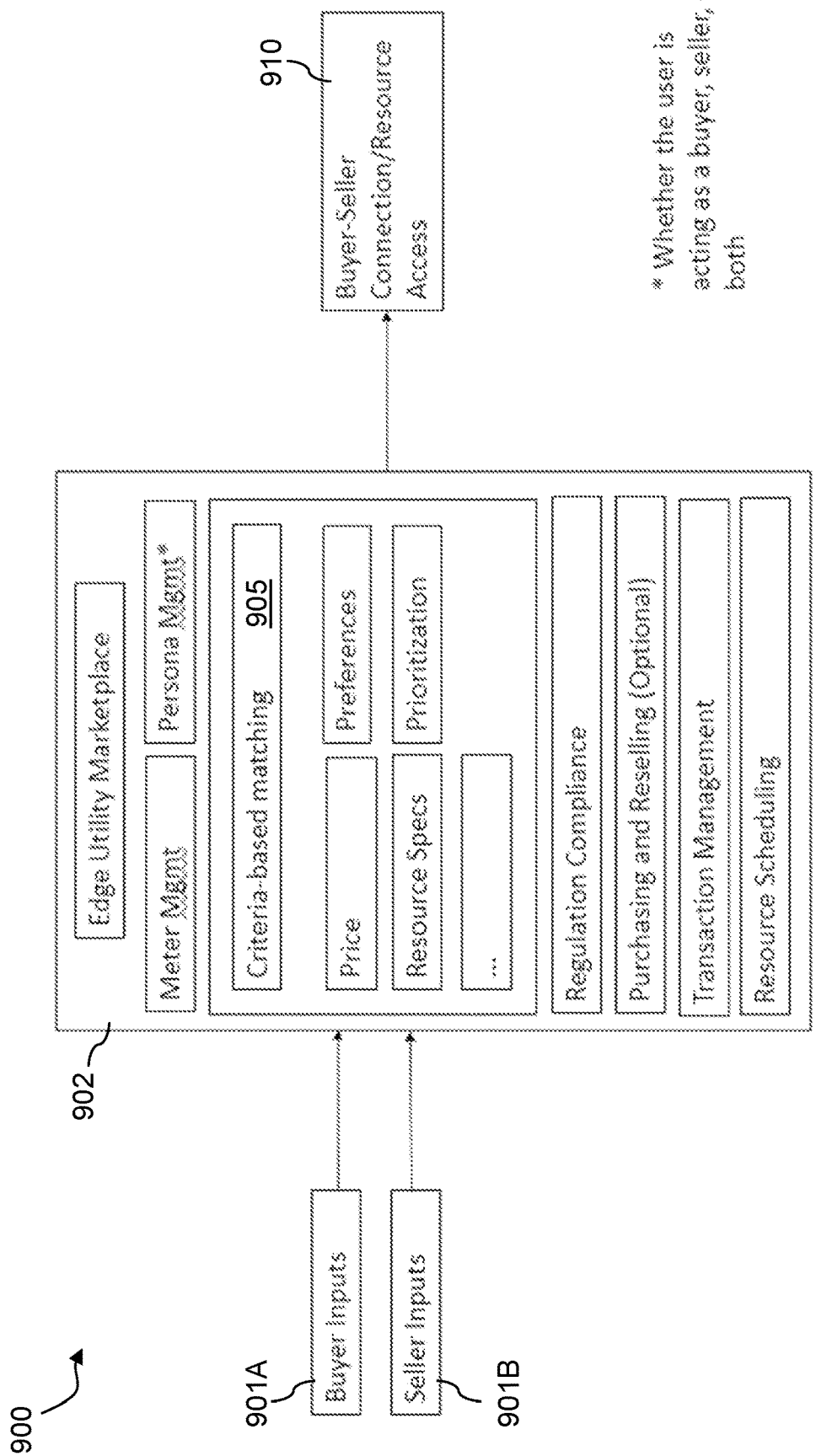
FIG. 9 is a block diagram of an edge utility system in an illustrative embodiment.

FIG. 9 shows an example edge utility system 900 in another illustrative embodiment. In this embodiment, the edge utility system 900 implements an edge utility marketplace 902 using one or more processing platforms each comprising one or more processing devices. The edge utility marketplace 902 receives user inputs 901 that more particularly include buyer inputs 901A and seller inputs 901B.

The edge utility marketplace 902 implements a criteria-based matching process 905 utilizing factors such as price, resource specs, preferences, prioritization, etc. as described in more detail elsewhere herein. Responsive to one or more results of a given instance of the criteria-based matching process 905, one or more buyer-seller connections are made and edge resource access is provided, as indicated at 910.

In some embodiments, price-related matching aspects of the criteria-based matching process 905 can be based at least in part on one or more techniques disclosed in U.S. patent application Ser. No. 16/885,476, filed May 28, 2020 and entitled "Private Edge-Station Auction House," which is incorporated by reference herein in its entirety.

The edge utility marketplace 902 in the present embodiment is more particularly configured to provide the following functionality:

1. Meter management. For example, ensuring that all users have meters installed and running.
2. Persona management. For example, determining whether a given user is or should be acting as a buyer, a seller, or both. This also includes complex situations when this status is regularly changing for one or more users.
3. Matching. This is performed based on buyer and seller inputs 901 applied to the criteria-based matching process 905.
4. Regulation compliance. For example, limiting the maximum price or requiring a minimum amount of energy efficiency compliance.
5. Purchasing and reselling. This functionality is illustratively denoted as optional in this particular embodiment, but such a notation should not be viewed as an indication that other components or features are required.
6. Transaction management. This can involve, for example, using technologies such as distributed ledgers, blockchains and/or smart contracts to capture immutable billing, to facilitate reseller markets, and to provide other types of secure processing. As a more particular example, this may include validating the purchase of a certain amount of computation on a certain type of edge resource (e.g., two hours of compute on a certain type of edge processor).
7. Resource scheduling. This includes scheduling jobs or other types of workloads for execution using aggregated edge resources.

The criteria-based matching process 905 in some embodiments is implemented utilizing a search-based algorithm with different preference and prioritization variables as a heuristic function. In the case when none of the available edge resources can fully satisfy all of the specified requirements for both buyer and seller, the buyer and seller with the highest heuristic score may be considered a match, unless either buyer or seller has indicated that all specified requirements need to be met.

When cost is the only factor whose requirements cannot be met, dynamic price adjustments can be made based on user's specification to increase prices for higher-demand resources (e.g., subject to regulations, and with restrictions to ban price gauging) or to decrease prices for under-demand resources. For example, buyers and sellers can both provide their highest and lowest prices (or these can be inferred based on historical data), and prices can be adjusted slightly until a match is achieved.

After a given instance of the criteria-based matching process 905 is complete, the edge utility marketplace 902 can also facilitate the buyer-seller connection and resource access, for example, through one or more APIs. In some cases, it will simply connect buyers and sellers; in other cases, the edge utility marketplace 902 will actually purchase the resources and resell them to buyers.

As indicated previously, the illustrative embodiments disclosed herein can provide a number of significant advantages relative to conventional arrangements.

For example, some embodiments are advantageously configured to provide an edge utility system that dynamically aggregates edge resources across multiple edge computing sites in accordance with user-configured preferences and priorities. Such an arrangement facilitates the buying and selling of edge capacity using a wide variety of factors, including energy efficiency of the edge resources and/or trust of the edge resource provider.

Some embodiments provide an edge utility matching process which accounts for factors other than price/cost, illustratively using heuristic search and scoring functions. Such a process can be based at least in part on, for example, a descriptor of edge services available from a producer, and a descriptor of edge services required by a consumer, or other arrangements of user inputs populated into one or more data structures.

One or more illustrative embodiments are advantageously configured to dynamically assemble an edge network in which users such as buyers and sellers of edge resources can easily join and leave.

Some embodiments provide an ability to automatically adjust prices within specified limits when particular edge resources are in high or low demand.

Additionally or alternatively, illustrative embodiments make it possible to consider several different types of events, such as I/O events, scheduled events, completed events, and reserved events (which would take place in the future). The total cost can be a combination of the amount reserved and the amount actually consumed, which may be less than if both were calculated separately.

Some embodiments implement random prioritization to ensure fairness. For example, an edge utility system can be configured to randomly assign sellers to buyers, as long as the sellers meet buyer needs, in order to ensure fairness.

In one or more embodiments, an ability to flag high-priority workloads is provided. Such an arrangement makes it possible to flag workloads of particular importance, such as those associated with providing assistance in a natural disaster. This is especially useful when the edge network is not capable of handling all buyer requirements, and lower-priority workloads need to be temporarily stopped or delayed.

Additionally or alternatively, illustrative embodiments can implement data preservation functionality to ensure that data stored at edge devices is preserved even during upgrades and deployments.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for dynamic aggregation of edge resources across multiple edge computing sites will now be described in greater detail with reference to FIGS. 10 and 11. Although described in the context of system 100, these platforms may also be used to implement at least portions of other information processing systems in other embodiments.

Figure 10:
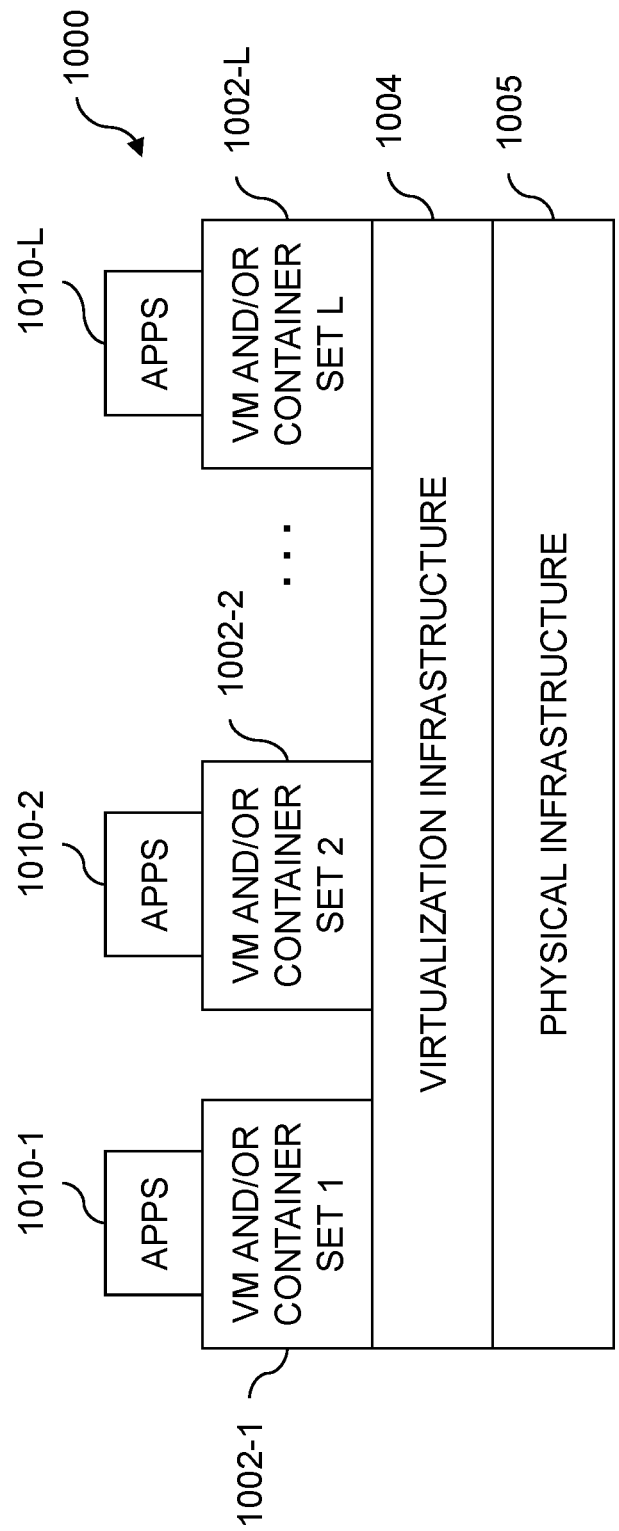
FIGS. 10 and 11 show examples of processing platforms that may be utilized to implement at least a portion of an information processing system in illustrative embodiments.
Figure 11:
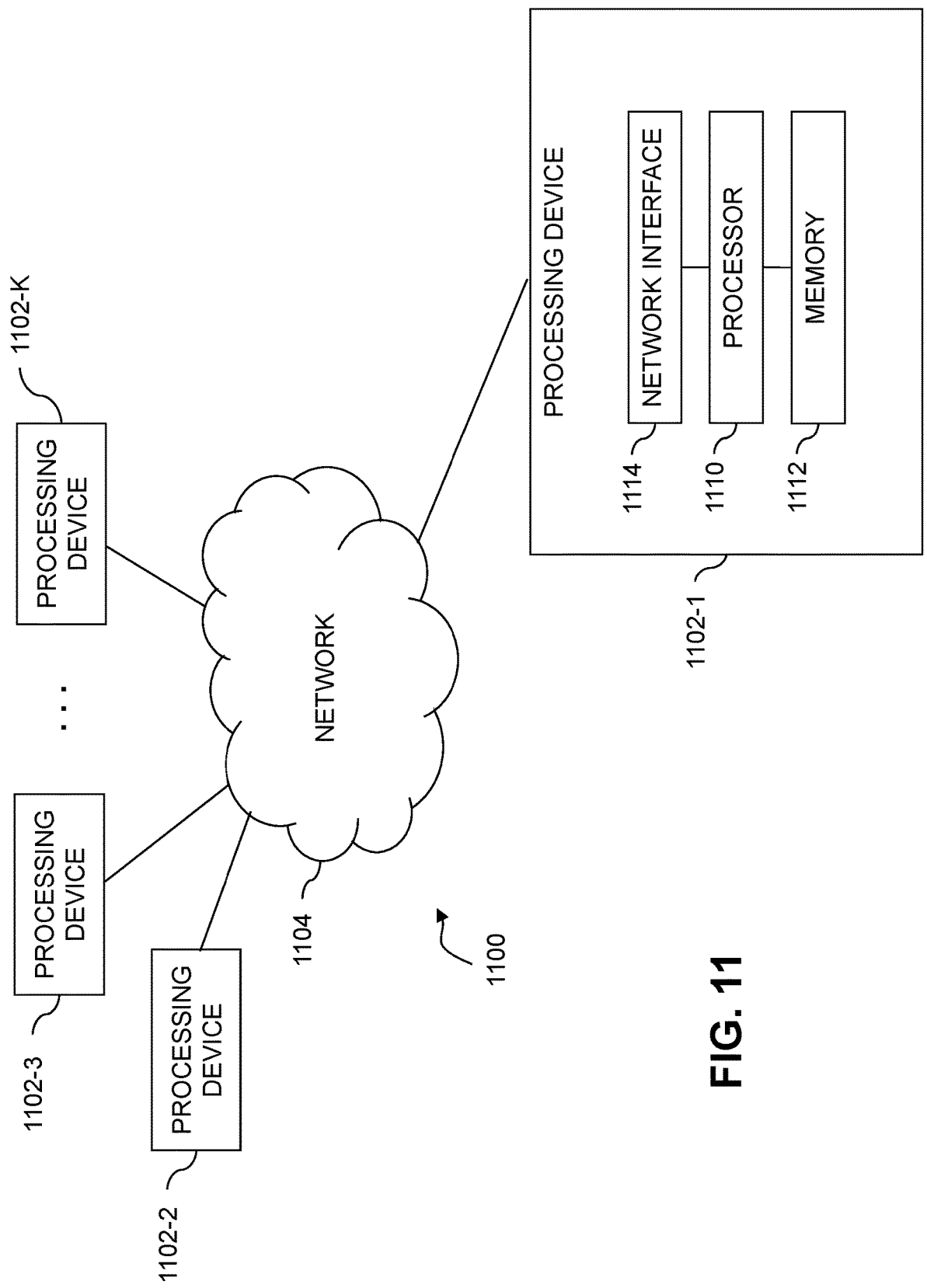

FIG. 10 shows an example processing platform comprising cloud infrastructure 1000. The cloud infrastructure 1000 comprises a combination of physical and virtual processing resources that may be utilized to implement at least a portion of the information processing system 100 in FIG. 1. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. A hypervisor platform may be used to implement a hypervisor within the virtualization infrastructure 1004, where the hypervisor platform has an associated virtual infrastructure management system. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112.

The processor 1110 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1112 may comprise random access memory (RAM), read-only memory (ROM), flash memory or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for dynamic aggregation of edge resources across multiple edge computing sites as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, processing devices, core computing sites, edge computing sites, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured:
to receive a plurality of inputs for respective users in an edge utility system, the edge utility system comprising a plurality of edge computing sites coupled to one or more core computing sites via at least one network, at least a first one of the inputs for a first one of the users characterizing edge resources requested by that user as a resource-acquiring user of the edge utility system for executing at least a portion of a workload of that user, and at least a second one of the inputs for a second one of the users characterizing edge resources available from that user as a resource-providing user of the edge utility system for executing at least a portion of a workload of another user;
to populate one or more data structures based at least in part on the plurality of inputs received for the respective users in the edge utility system;
to aggregate edge resources of multiple ones of the edge computing sites into an edge network based at least in part on the populated data structures; and
to utilize at least a portion of the aggregated edge resources of the edge network to execute at least a portion of a workload of a particular one of the users, including allocating at least a portion of the edge resources available from the second user as the resource-providing user of the edge utility system to execute at least a portion of the workload of the first user as the resource-acquiring user of the edge utility system;
wherein the aggregated edge resources comprise resources of at least one edge device, the resources of the at least one edge device having been previously acquired by the second user from at least one additional user of the edge utility system other than the first user, the at least one edge device having a corresponding edge utility meter configured to determine a particular portion of the previously-acquired resources of the at least one edge device that are utilized in executing one or more portions of the workload of the first user;

wherein the edge utility meter corresponding to the at least one edge device comprises one of a plurality of edge utility meters deployed in the edge utility system for different ones of a plurality of edge devices;

wherein different ones of the edge utility meters are configured for respective different ones of the first, second and additional users;

wherein different instances of identifying information of respective ones of the users are placed into one or more queues of the edge utility system in association with meter readings generated by their respective corresponding edge utility meters; and wherein the aggregated edge resources are determined based at least in part on results of matching at least one of the users having first identifying information selected from the one or more queues with another one of the users having second identifying information selected from the one or more queues, the second identifying information being different than the first identifying information.

2. The apparatus of claim 1 wherein each of at least a subset of the edge computing sites of the edge utility system comprises a plurality of edge devices and at least one edge utility meter configured to measure utilization of the edge devices of that edge computing site by one or more of the users in the edge utility system.

3. The apparatus of claim 1 wherein the edge resources of each of at least a subset of the edge computing sites of the edge utility system comprise at least one of compute, storage and network resources of a plurality of edge devices of that edge computing site.

4. The apparatus of claim 1 wherein the one or more core computing sites of the edge utility system comprise at least one data center implemented at least in part utilizing cloud infrastructure.

5. The apparatus of claim 1 wherein the aggregated edge resources of the edge network are arranged in a multi-level hierarchy with communication of information between levels of the hierarchy being handled by corresponding controllers implemented at respective ones of those levels.

6. The apparatus of claim 1 wherein the first input for the first user comprises at least one of:
a trust indicator specifying a trust level for providers of edge resources for executing at least a portion of the workload of that user; and
an energy efficiency indicator specifying an energy efficiency level for providers of edge resources for executing at least a portion of the workload of that user.

7. The apparatus of claim 1 wherein aggregating edge resources of multiple ones of the edge computing sites into an edge network based at least in part on the populated data structures comprises aggregating edge resources from different edge computing sites at different geographic locations to form the edge network.

8. The apparatus of claim 7 wherein forming the edge network comprises:
forming a first edge network utilizing edge resources from a first set of edge computing sites at respective geographic locations; and
forming a second edge network utilizing edge resources from a second set of edge computing sites at respective geographic locations.

9. The apparatus of claim 8 wherein the first and second edge networks overlap with one another at one or more of the geographic locations.

10. The apparatus of claim 1 wherein aggregating edge resources of multiple ones of the edge computing sites into an edge network based at least in part on the populated data structures comprises:
comparing characteristics from the first input for the first user to characteristics from the second input for the second user; and
matching one or more edge resources requested by the first user with one or more edge resources available from the second user based at least in part on the comparing;
wherein the aggregated edge resources of the edge network comprise the one or more edge resources available from the second user that match the one or more edge resources requested by the first user.

11. The apparatus of claim 1 wherein the at least one processing device is further configured to monitor at least one edge utility meter for each of one or more edge devices of each of at least a subset of the edge computing sites.

12. The apparatus of claim 11 wherein the edge utility meter is configured to provide metrics measuring utilization of edge resources of its corresponding one or more edge devices.

13. The apparatus of claim 11 wherein the edge utility meter is periodically updated in conjunction with execution of at least a portion of the workload of the particular one of the users utilizing aggregated edge resources that include one or more edge resources of its corresponding one or more edge devices.

14. The apparatus of claim 1 wherein each of the edge computing sites is configured to broadcast updates regarding its edge resources to at least one scheduler that controls workload execution utilizing the aggregate edge resources of the edge network.

15. A computer program product comprising a non-transitory processor-readable storage medium having stored therein program code of one or more software programs, wherein the program code when executed by at least one processing device causes the at least one processing device:
to receive a plurality of inputs for respective users in an edge utility system, the edge utility system comprising a plurality of edge computing sites coupled to one or more core computing sites via at least one network, at least a first one of the inputs for a first one of the users characterizing edge resources requested by that user as a resource-acquiring user of the edge utility system for executing at least a portion of a workload of that user, and at least a second one of the inputs for a second one of the users characterizing edge resources available from that user as a resource-providing user of the edge utility system for executing at least a portion of a workload of another user;
to populate one or more data structures based at least in part on the plurality of inputs received for the respective users in the edge utility system;
to aggregate edge resources of multiple ones of the edge computing sites into an edge network based at least in part on the populated data structures; and
to utilize at least a portion of the aggregated edge resources of the edge network to execute at least a portion of a workload of a particular one of the users, including allocating at least a portion of the edge resources available from the second user as the resource-providing user of the edge utility system to execute at least a portion of the workload of the first user as the resource-acquiring user of the edge utility system;

wherein the aggregated edge resources comprise resources of at least one edge device, the resources of the at least one edge device having been previously acquired by the second user from at least one additional user of the edge utility system other than the first user, the at least one edge device having a corresponding edge utility meter configured to determine a particular portion of the previously-acquired resources of the at least one edge device that are utilized in executing one or more portions of the workload of the first user;

wherein the edge utility meter corresponding to the at least one edge device comprises one of a plurality of edge utility meters deployed in the edge utility system for different ones of a plurality of edge devices;

wherein different ones of the edge utility meters are configured for respective different ones of the first, second and additional users;

wherein different instances of identifying information of respective ones of the users are placed into one or more queues of the edge utility system in association with meter readings generated by their respective corresponding edge utility meters; and wherein the aggregated edge resources are determined based at least in part on results of matching at least one of the users having first identifying information selected from the one or more queues with another one of the users having second identifying information selected from the one or more queues, the second identifying information being different than the first identifying information.

16. The computer program product of claim 15 wherein each of at least a subset of the edge computing sites of the edge utility system comprises a plurality of edge devices and at least one edge utility meter configured to measure utilization of the edge devices of that edge computing site by one or more of the users in the edge utility system.

17. The computer program product of claim 15 wherein aggregating edge resources of multiple ones of the edge computing sites into an edge network based at least in part on the populated data structures comprises:

comparing characteristics from the first input for the first user to characteristics from the second input for the second user; and matching one or more edge resources requested by the first user with one or more edge resources available from the second user based at least in part on the comparing;

wherein the aggregated edge resources of the edge network comprise the one or more edge resources available from the second user that match the one or more edge resources requested by the first user.

18. A method comprising:

receiving a plurality of inputs for respective users in an edge utility system, the edge utility system comprising a plurality of edge computing sites coupled to one or more core computing sites via at least one network, at least a first one of the inputs for a first one of the users characterizing edge resources requested by that user as a resource-acquiring user of the edge utility system for executing at least a portion of a workload of that user, and at least a second one of the inputs for a second one of the users characterizing edge resources available from that user as a resource-providing user of the edge utility system for executing at least a portion of a workload of another user;

populating one or more data structures based at least in part on the plurality of inputs received for the respective users in the edge utility system;

aggregating edge resources of multiple ones of the edge computing sites into an edge network based at least in part on the populated data structures; and utilizing at least a portion of the aggregated edge resources of the edge network to execute at least a portion of a workload of a particular one of the users, including allocating at least a portion of the edge resources available from the second user as the resource-providing user of the edge utility system to execute at least a portion of the workload of the first user as the resource-acquiring user of the edge utility system;

wherein the aggregated edge resources comprise resources of at least one edge device, the resources of the at least one edge device having been previously acquired by the second user from at least one additional user of the edge utility system other than the first user, the at least one edge device having a corresponding edge utility meter configured to determine a particular portion of the previously-acquired resources of the at least one edge device that are utilized in executing one or more portions of the workload of the first user;

wherein the edge utility meter corresponding to the at least one edge device comprises one of a plurality of edge utility meters deployed in the edge utility system for different ones of a plurality of edge devices;

wherein different ones of the edge utility meters are configured for respective different ones of the first, second and additional users;

wherein different instances of identifying information of respective ones of the users are placed into one or more queues of the edge utility system in association with meter readings generated by their respective corresponding edge utility meters;

wherein the aggregated edge resources are determined based at least in part on results of matching at least one of the users having first identifying information selected from the one or more queues with another one of the users having second identifying information selected from the one or more queues, the second identifying information being different than the first identifying information; and wherein the method is performed by at least one processing device comprising a processor coupled to a memory.

19. The method of claim 18 wherein each of at least a subset of the edge computing sites of the edge utility system comprises a plurality of edge devices and at least one edge utility meter configured to measure utilization of the edge devices of that edge computing site by one or more of the users in the edge utility system.

20. The method of claim 18 wherein aggregating edge resources of multiple ones of the edge computing sites into an edge network based at least in part on the populated data structures comprises:

comparing characteristics from the first input for the first user to characteristics from the second input for the second user; and matching one or more edge resources requested by the first user with one or more edge resources available from the second user based at least in part on the comparing;

wherein the aggregated edge resources of the edge network comprise the one or more edge resources available from the second user that match the one or more edge resources requested by the first user.

* * * * *